Sept. 20, 1960 S. E. DE MARCO 2,953,209
STRIPPING ATTACHMENT FOR SWEET POTATO DIGGER
Filed Dec. 15, 1958 3 Sheets-Sheet 1
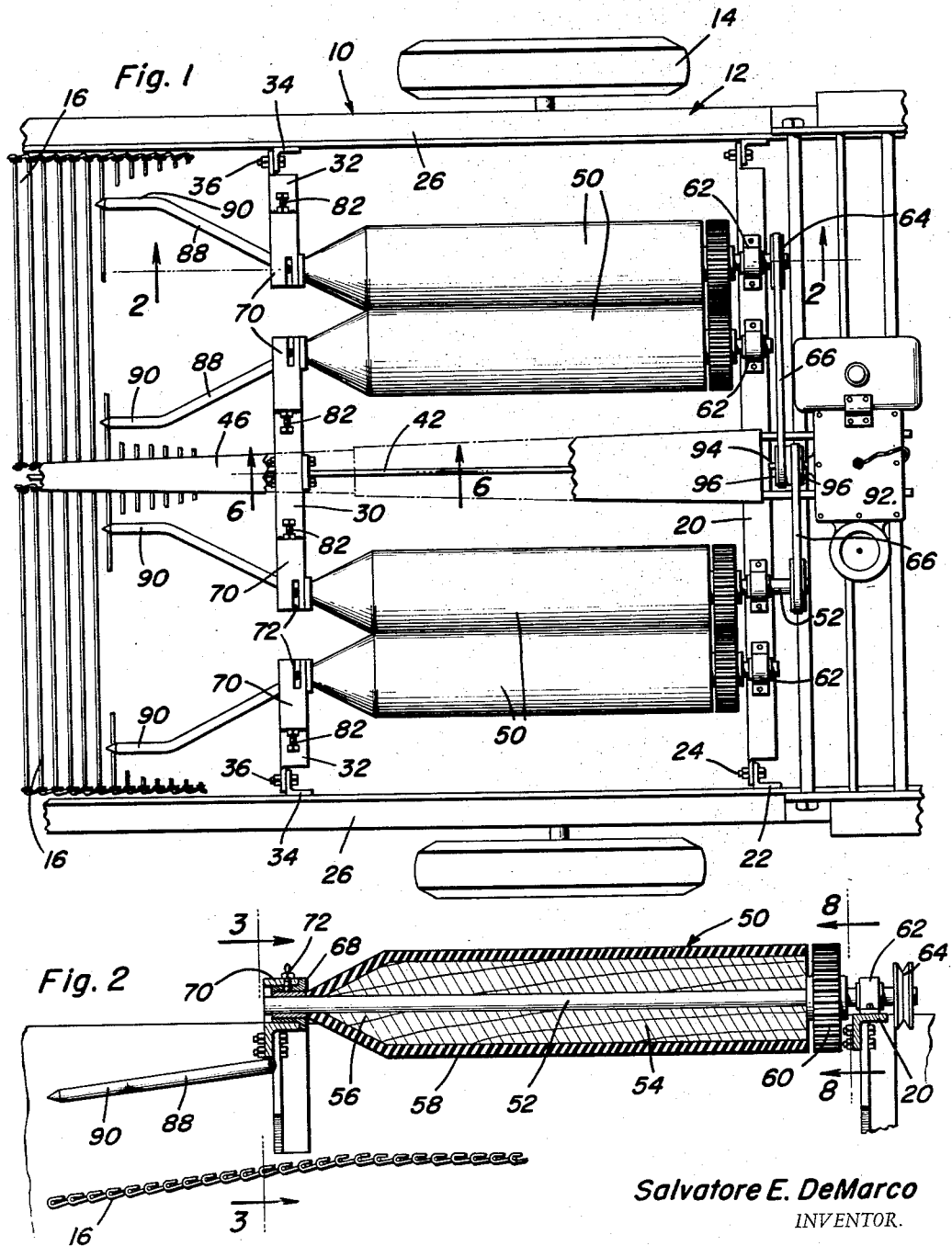
Salvatore E. DeMarco
INVENTOR.

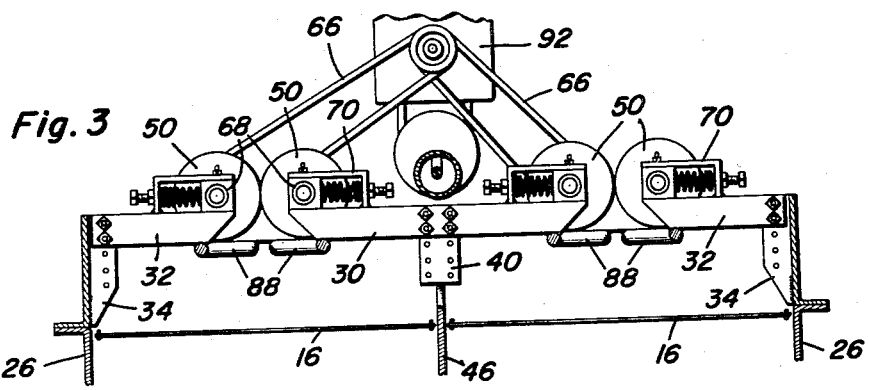
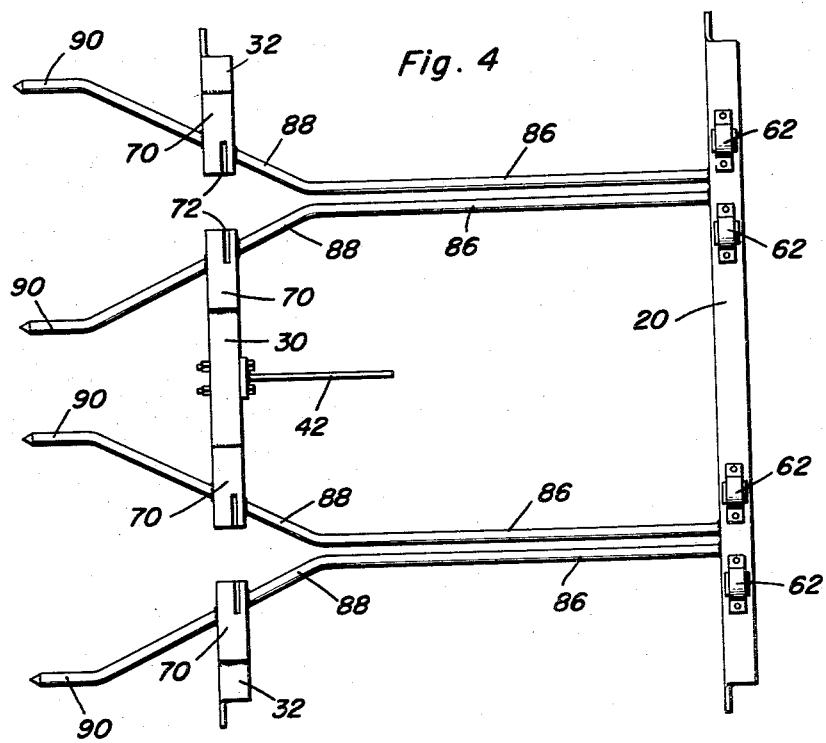

Sept. 20, 1960     S. E. DE MARCO     2,953,209
STRIPPING ATTACHMENT FOR SWEET POTATO DIGGER
Filed Dec. 15, 1958     3 Sheets-Sheet 3
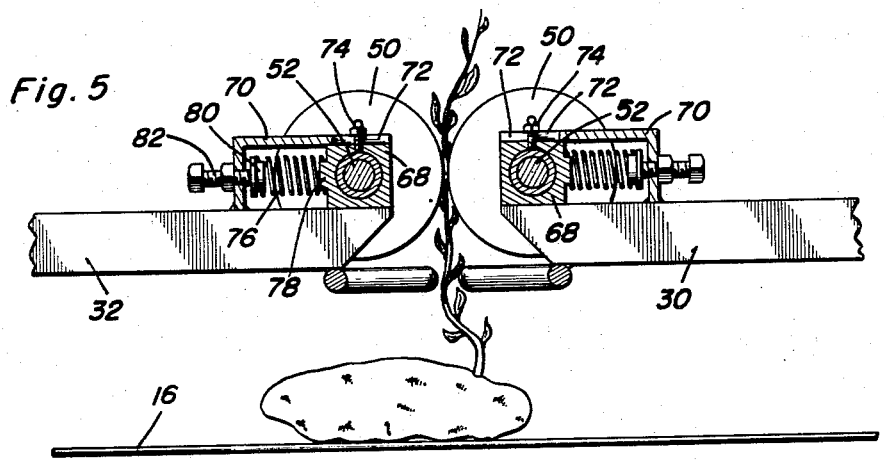
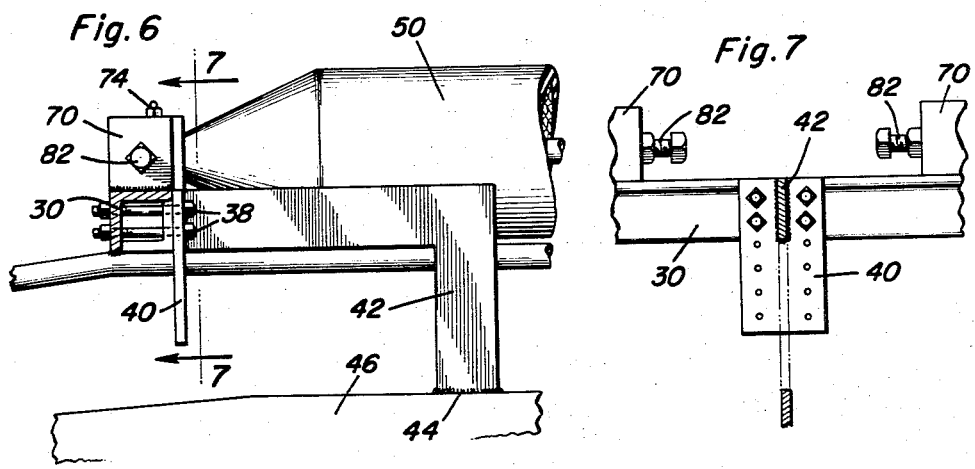
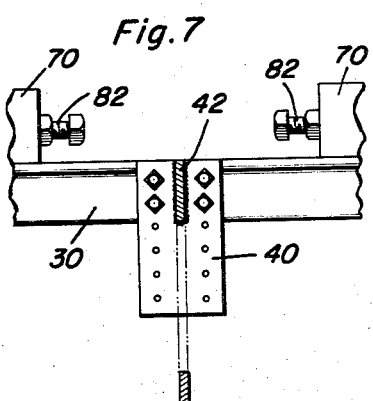
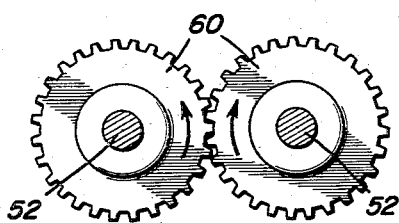
Salvatore E. DeMarco
INVENTOR.
BY *Clarence A. O'Brien*
*and Harvey B. Jacobson*
Attorneys

United States Patent Office 2,953,209
Patented Sept. 20, 1960

---

2,953,209

STRIPPING ATTACHMENT FOR SWEET POTATO DIGGER

Salvatore E. De Marco, 321 E. Pleasant St., Hammonton, N.J.

Filed Dec. 15, 1958, Ser. No. 780,448

4 Claims. (Cl. 171—28)

This invention comprises a novel and useful stripping attachment for sweet potato diggers and more particularly relates to an attachment adapted to be mounted upon a conventional construction of a sweet potato digger and operated by the mechanism thereof for effectively stripping potatoes from the potato vines which are gathered by the digger.

The primary object of this invention is to provide a stripping device mounted upon and operated by the mechanism of conventional potato diggers for effectively stripping the potatoes from the vines gathered by the digger.

A further object of the invention is to provide a device in accordance with the preceding object which may effectively be mounted upon a potato digger of the multiple row type whereby a separate stripping means is provided for handling the potato vines which are gathered from a single row of potato plants.

Still another object of the invention is to provide a stripping attachment which may be easily applied to or removed from conventional potato diggers as a stripping attachment therefor.

Another object of the invention is to provide a stripping attachment in accordance with the foregoing objects wherein the stripping units comprise pairs of stripping rollers resiliently pressed against each other to form a stripping crotch therebetween and operated in reverse directions of rotation, together with means yieldingly urging the rollers towards each other.

A further object of the invention is to provide a stripping attachment in accordance with the foregoing objects wherein each stripping unit of the device shall include a pair of stripping rollers in combination with a pair of guide rods associated therewith for guiding the potato plants conveyed by the potato digger into the crotch of the stripping rollers.

Still another object of the invention is to provide a stripping attachment in compliance with the foregoing objects wherein the forward or inlet ends of the stripping rollers of the attachment are supported in an improved manner from the frame of the potato digger and above the potato plant conveying elements of the digger.

And still another object of the invention is to provide an attachment in accordance with the preceding objects wherein a common drive means operable from the mechanism of the potato digger is connected to each of the stripping units for simultaneous operation of the stripping rollers thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a portion of a conventional sweet potato digger, parts of the conveyors and of the frame thereof being broken way and showing the manner in which a pair of stripping units in accordance with this invention is mounted thereon;

Figure 2 is a vertical longitudinal sectional view taken substantially upon the plane indicated by the section line 2—2 of Figure 1 and showing upon an enlarged scale the structure and mounting of one of the stripper rollers of the invention and its relation to a chain conveyor of the digger, parts being broken away;

Figure 3 is a view in vertical transverse section taken substantially upon the plane indicated by the section line 3—3 of Figure 2 and showing in particular the support means for the stripper unit and the relatively movable journals for the forward ends of the stripper rollers thereof;

Figure 4 is a view in top plan of a portion of the support means for the attachment and showing the disposition and mounting of the pairs of guide rods thereon and of the fixed journals for the stripper rollers;

Figure 5 is a detail vertical transverse view showing the journal block in section and showing the manner in which a potato vine carried by the digger conveyor is passed into the crotch or nip of the stripping rollers of a unit for stripping the vine from the potatoes thereon;

Figure 6 is a vertical longitudinal sectional view taken substantially upon the plane indicated by the section line 6—6 of Figure 1 and upon an enlarged scale and showing a portion of the support and mounting means for the movable ends of the stripper rollers and the guide rods associated therewith;

Figure 7 is a detail view in vertical transverse section taken substantially upon the plane indicated by the section line 7—7 of Figure 6; and, Figure 8 is a detail view in vertical transverse section taken substantially upon the plane indicated by the section line 8—8 of Figure 2 and showing the gearing connecting the pair of stripper rollers of each unit for effecting opposite rotation of these rollers.

Conventional potato diggers of the single or multiple row type consist of a mobile frame adapted to move along a row or rows of potato plants and are provided with plows or digging implements at the forward end thereof for digging the entire potato plants from their rows, together with conveyors for lifting the dug plants with the attached potatoes and conveying them upwardly across the frame of the machine and then discharge the same either in piles upon the ground or into various bins or collection means therefor. Subsequently, a further operation is necessary in order to strip the potatoes from the potato vines. It is the intent of the present invention to provide an attachment which may readily be applied to conventional potato diggers and will effectively strip the potatoes from the vines during their transportation by the conveyors of the digger so that the vines may be subsequently discharged and the stripped potatoes may then be carried by the conveyors for collection in a suitable manner when they are discharged from these conveyors. The stripping device of this invention therefore greatly facilitates the stripping of potatoes from the vines by reducing the labor required to handle the same, eliminating the subsequent operation of handling the discharged potatoes vines for the purpose of stripping potatoes therefrom, and enables the digging machine to perform the additional function of stripping potatoes and discharging the same into a desired place of collection.

The present invention is particularly characterized by the provision of an improved supporting or mounting means whereby the elements of the stripping attachment may be advantageously and easily applied to or removed from the conventional structure of the conventional potato digger, whereby the sets of stripping rollers may be driven from a common source of power provided by the conventional potato digger; and whereby novel and advantageous sets of guide rods, one pair of guide rods being provided for each stripper unit, are supported and mounted in a novel and improved association upon the supporting and mounting means of the stripping units.

Referring first to Figure 1, the numeral 10 designates generally a potato digger of any conventional type, the same including a support frame indicated generally by the numeral 12 and having an axle and wheel assembly as at 14. The potato digger as illustrated is of the multiple row type, the same including a pair of conveyors 16 which as illustrated are of the chain type, the conveyors being mounted upon the frame in a suitable well known manner and spaced from each other by a sufficient distance to enable each conveyor to be disposed for receiving the potato plants from a single row or plants as dug by the digging elements, not shown, of the digger.

Inasmuch as the structure of the conventional potato digger is well known, and since the present invention is not limited particularly to the construction thereof, a further description of the same is deemed to be unnecessary other than the reference made hereinafter to certain portions of the frame of the digger which are employed for the purpose of mounting and supporting the elements of the attachment forming the subject matter of this invention.

Although the stripping attachment of this invention is not limited thereto, for convenience of illustration there has been shown a portion of the well known John Deere potato digger of the double row, Series 30 type.

A securing and mounting means is provided whereby the stripping units of this attachment may be readily applied to and if desired removed from the frame 12 of the conventional potato digger. This support and mounting means consists of a rearward transverse member 20, see also Figure 4, which is suitably secured as by brackets 22 and bolts 24 to the side frame members 26 of the digger frame. There are further provided front support means. The latter consist of an intermediate cross member 30 together with a pair of end cross members each indicated by the numeral 32 and which are spaced from the intermediate member. The end members are likewise secured as by brackets 34 and bolts 36 to the side frame members 26 previously mentioned. The intermediate cross member 30 is secured intermediate its ends as by bolts 38 to a bracket 40, which latter is in turn carried by an L-shaped supporting bracket or standard 42 which is welded as at 44 at its lower end to an intermediate frame member 46 lying between and parallel to the side frame members 26.

From a consideration of Figures 1 and 4, it will be observed that the front support means has the intermediate cross member 30 spaced from the adjacent ends of the end cross members 32 a sufficient distance to permit passage of potato vines therebetween as set forth hereinafter.

Supported by the front and rear support means are a plurality of stripper units. Each stripper unit comprises a pair of stripping rollers each designated by the numeral 50 which are disposed in side-by-side relation and in frictional and yielding engagement with each other.

Referring especially to Figure 2 it will be observed that each of the rollers 50 consist of a central axle or shaft 52 which is surrounded by the body 54 of the roller. The latter of any suitable material is cylindrical throughout the major portion of its length, having its forward end provided with a conical taper 56. A coating of rubber or other suitable material as at 58 comprises a sleeve surrounding the body of the roller 54 and including its conical tip 56.

Secured to the rearward end of the shaft 52 is a gear 60 and it will be seen as from Figures 1 and 8 that the gears of the adjacent rollers of each pair of rollers are continuously in mesh with each other to ensure that the rollers will rotate in opposite directions. The direction of rotation is such as that indicated by the arrows in Figure 8, and as shown in Figure 5, potato vines engaging the nip or crotch on the lower side of the rollers will be drawn upwardly therethrough when the rollers rotate in a direction as indicated by the arrows in Figure 8, thereby stripping the vines from the potatoes.

At what may be termed their rearward ends, the rollers 50 are provided with stationary journals 62, see also Figure 4, which are fixedly mounted upon the transverse support member 20. One shaft 52 of each pair of rollers 50 which comprise a stripping unit is extended beyond the journal 62 to receive thereon a pulley 64 which is engaged by a belt 66 comprising the driving means for the rollers of that unit.

At their front ends, each of the shafts or axles 52 are journaled in relatively movable journal members 68. These journal members are carried by the cross members 30, 32 previously mentioned.

Referring now especially to the detail views of Figures 3 and 5 in conjunction with Figures 1 and 4, it will be observed that the relatively movable journals 68 are in the form of blocks which are slidably received upon the top surface of the front cross members 30 or 32, being slidable within housings 70 welded thereon. It will be observed that the adjacent ends of the intermediate cross member 30 and the two end cross members 32 have these housings fixedly secured thereto and facing each other, and that there are provided slots 72 in these housings through which extend upwardly projecting lubricating fittings 74 by which lubricant can be supplied to the shafts 52 in their journal bearings. These fittings extending through the slot 72 also comprise guides for the reciprocably mounted journals 68. Compression springs 76 are provided within the housing 70 and have one end of each abutted against the journal block 68 and surrounding a centering lug 78 thereon, while the other end is engaged against a cup 80 carried by adjusting screw 82 which is threaded through an end wall of the housing 70. Thus, by manipulating the adjusting screws 82, any desired resilient force can be applied through the springs 76 to the relatively movable journal 68 to thereby yieldingly urge with a controlled and adjusted pressure the rollers 50 towards each other. It will be understood that there is a limited or slight movement of a swivelling nature of the axles 52 in the relatively fixed journals 62 so as to permit a limited lateral movement of the rollers towards and from each other for this purpose.

Also, supported by the front and rear support and mounting means are pairs of guide rods, there being provided one pair of guide rods for each pair of stripping rollers comprising a stripping unit. Thus, as will be more readily apparent from Figure 4, in conjunction with Figures 1 and 3, each pair of guide rods comprises a pair of rod-like members 86, the guide rods having their rearward ends disposed beneath and welded or otherwise fixedly secured to the transverse member 20 previously mentioned. As their forward ends, the guide rods terminate in outwardly divergent portions 88 which at their outermost ends are provided with pointed end portions 90. The divergent portions 88 underlie and are welded or otherwise rigidly secured to the underside of the front cross members 30, 32 at the adjacent ends of the latter. The rods 86 are parallel to the rollers 50 and are disposed between these rollers and the associated conveyor 16, and further are positioned on opposite sides of the crotch of each pair of rollers.

The divergent end portions of the pairs of guide rods serves to receive potato vines carried by the conveyors 16 and collect these vines and guide the same into the crotch of the rollers 50, guiding the vines through the spaces between the adjacent ends of the front cross members and between the tapered conical front ends of the pair of rollers of each stripping unit. Any necessary movement of the rollers towards or away from each other will be yieldingly permitted by the aforementioned relatively movable journals at the front ends of the rollers.

It will be observed therefore that each stripping unit consists of a pair of stripping rollers together with a pair of the guide rods associated therewith and disposed in closely spaced position above one of the conveyors 16 so that the vines carried by that conveyor, which constitute all of the vines removed from a single row of potato plants, can be guided into the nip or crotch of the stripping rollers. As the vines are lifted through the rollers by their opposite rotation, they will be pulled from the potatoes which are prevented from passing through the rollers by virtue of the close spacing of the guide rods 86, thereby causing the potatoes to drop downward upon the conveyor 16 and be transported by the latter to the place of discharge from the potato digger, whether this be a pile upon the ground or a suitable container positioned to receive the discharge from the conveyors.

In some instances it may be desired and satisfactory to operate the driving belt 66 from some of the mechanism of the potato digger and its machinery. However, it is preferred to provide an independent source of power for this purpose. Accordingly, there is provided a power plant designated generally by the numeral 92 which may be conveniently carried by a portion of the frame 12 of the potato digger. The power plant may consist of an electric motor or if desired of a gasoline engine and the like, the same, however, being provided with a drive shaft 94 upon which are mounted a plurality of pulleys 96 over each of which is entrained one of the belts 66. Thus, it will be observed that the plurality of stripper units are driven from a common source of power which source of power may be completely independent of the mechanism of the potato digger. An important feature of this invention is that the speed of travel of the stripping rollers 50 may thus be varied independently of the rate of travel of the potato digger along the rows of potatoes being collected thereby.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a potato digger of the type having a support frame including frame members, a pair of spaced conveyors for transporting along the top of said frame the potato vines and attached potatoes dug from a pair of rows of potato plants, a potato stripping attachment including a single rear transverse member secured to said frame members, aligned front transverse support members including a pair of spaced end cross members and an intermediate cross member mounted centrally therebetween, a pair of end stripping rollers, each intermediate stripping roller rotatably journaled on a stationary journal and a relatively movable journal, resilient means carried by said front support members operatively engaged with said relatively movable journals urging each of said end rollers into engagement with an adjacent intermediate roller, drive means operatively associated with said rollers, each of said rollers mounted on said frame and disposed above said conveyors and provided with a cylindrical frictional and a tapered forward end surface, said adjacent end and intermediate rollers forming roller pairs each defining a crotch between said adjacent rollers, a pair of closely spaced guide rods for each pair of rollers disposed between the rollers and the associated conveyor and on opposite sides of said crotch, said guide rods being mounted on the frame and extending beyond said forward ends of said rollers and terminating in outwardly divergent extremities for guiding the potato vines transported by the associated conveyor into the crotch of said roller pairs, said spacing between said guide rods being sufficiently large to pass said vines and sufficiently small to prevent passage of said potatoes.

2. The combination of claim 1 wherein said drive means includes a gear fixed to each of said rollers, said gears of said adjacent rollers drivingly meshed, and rotational power means connected to one roller of each of said roller pairs.

3. The combination of claim 1 wherein said guide rods extend throughout the length of said rollers.

4. The combination of claim 2 wherein said rotational power means includes a drive shaft having a pulley thereon, a pulley secured to said one roller of each of said roller pairs, and a drive belt operatively connecting said pulleys.

References Cited in the file of this patent
UNITED STATES PATENTS

| | | |
|---|---|---|
| 2,239,458 | Hetzel | Apr. 22, 1941 |
| 2,314,773 | Dahlman | Mar. 23, 1943 |